May 10, 1927.
H. G. TUTHILL
1,627,625
SIGNAL
Filed Feb. 16, 1925 5 Sheets-Sheet 1
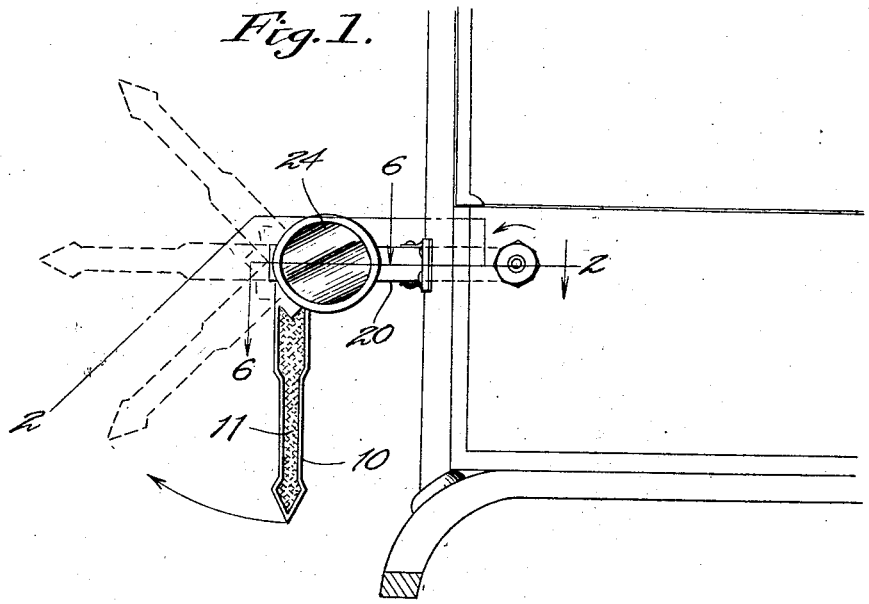
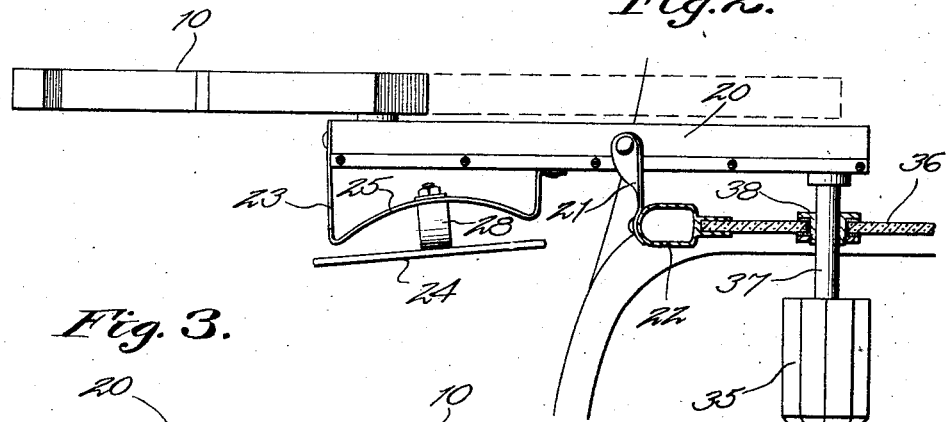
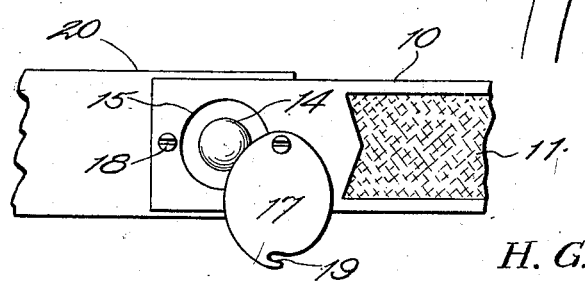
Inventor
H. G. Tuthill
By Victor J. Evans
Attorney
Witnesses:

May 10, 1927.  H. G. TUTHILL  1,627,625
SIGNAL
Filed Feb. 16, 1925    5 Sheets-Sheet 2
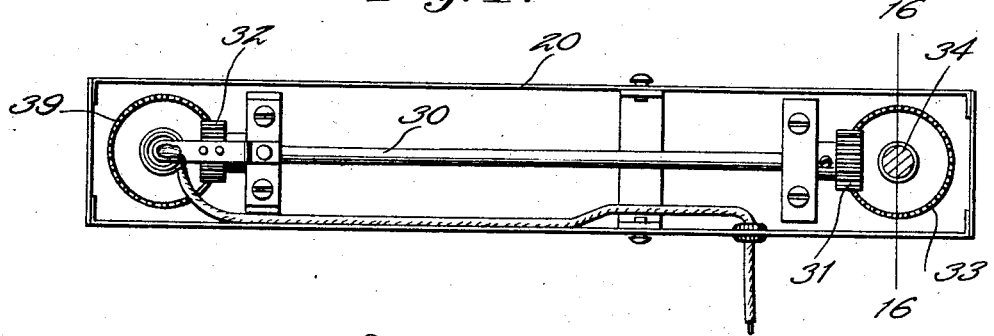
Fig. 4.
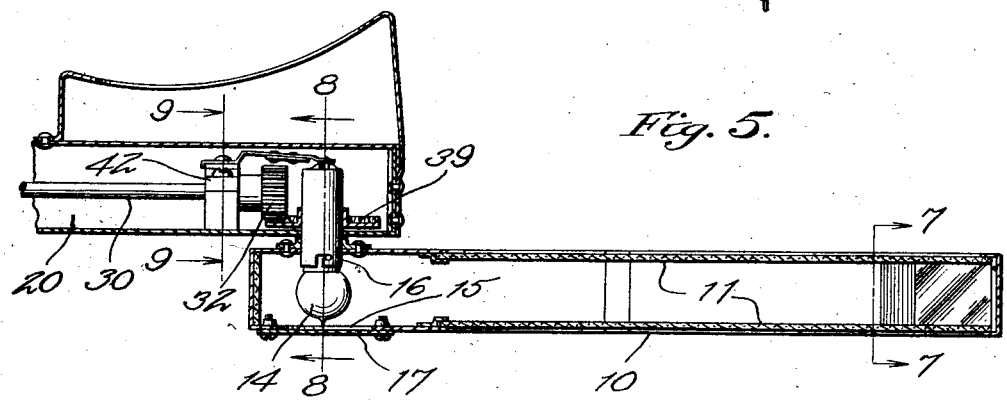
Fig. 5.
Fig. 6.
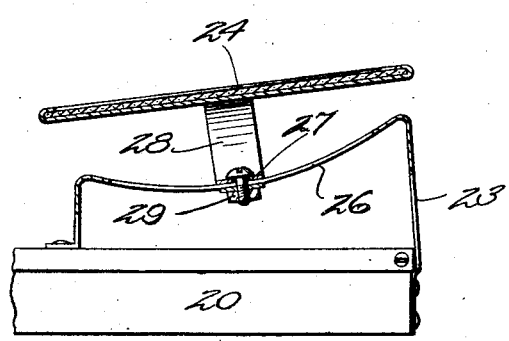
Fig. 7.
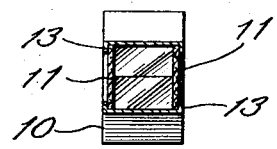
Inventor
H. G. Tuthill
Witnesses:
R. E. Wise.
By Victor J. Evans
Attorney

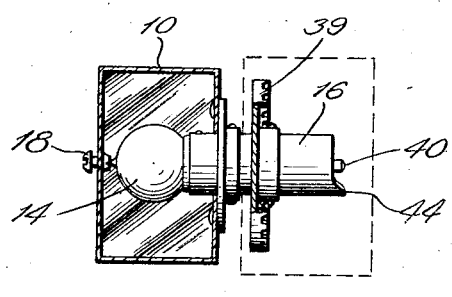
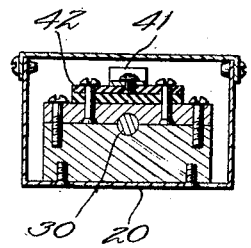
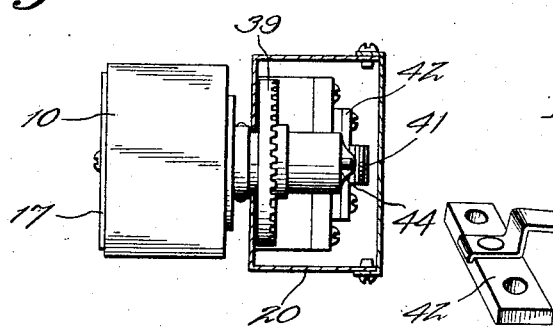
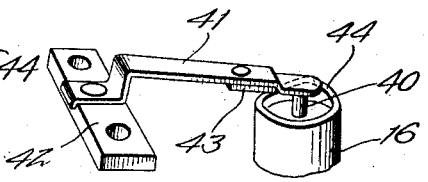
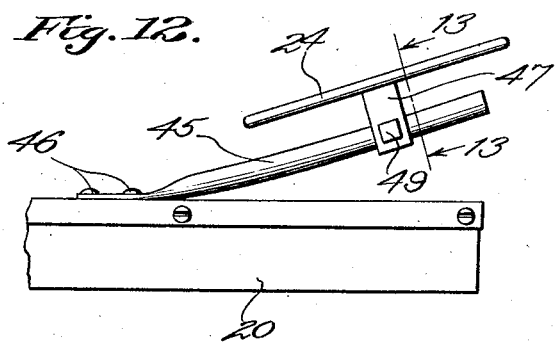
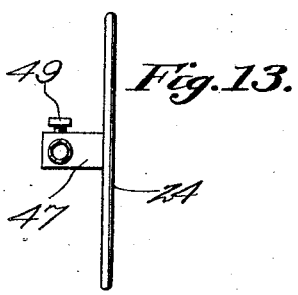

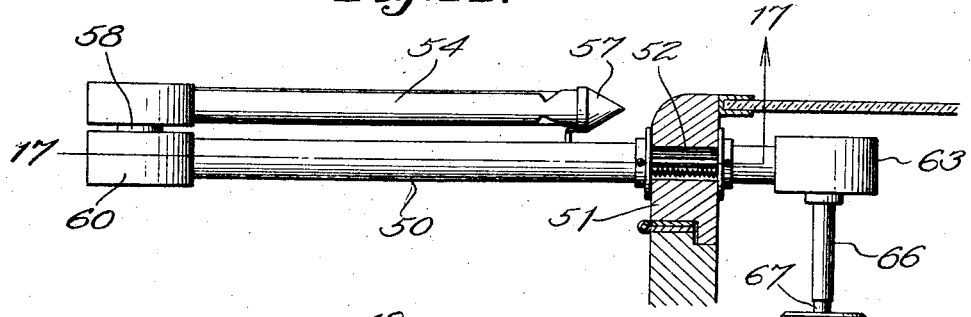
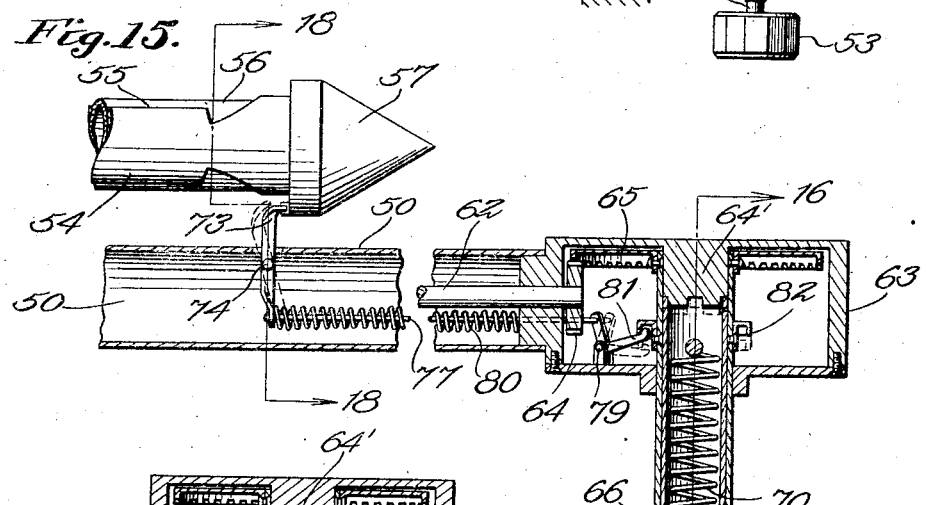
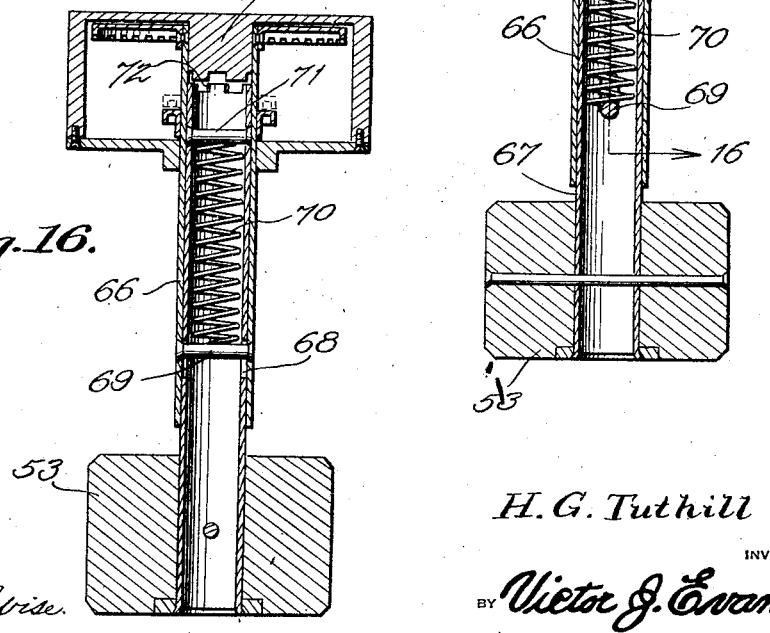

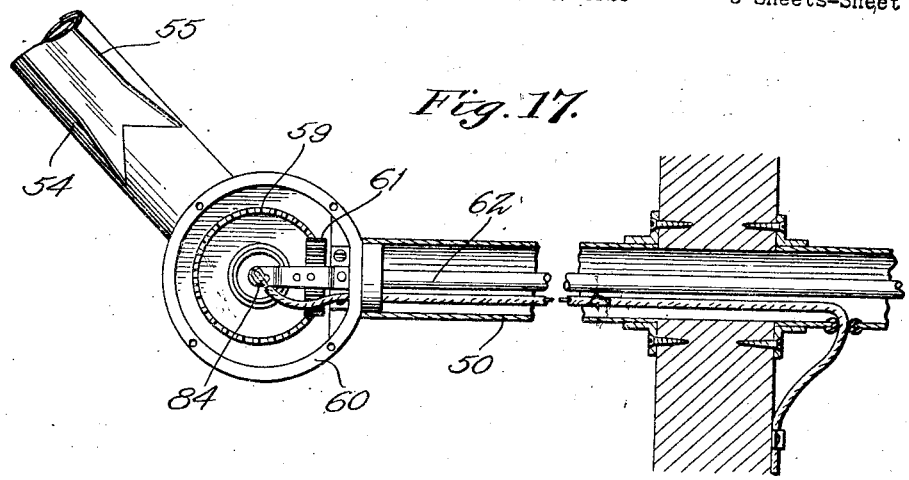
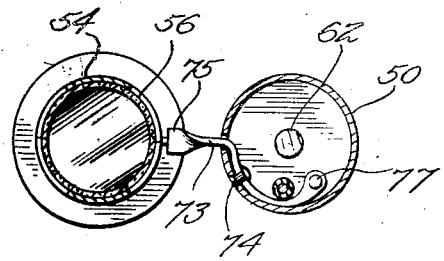
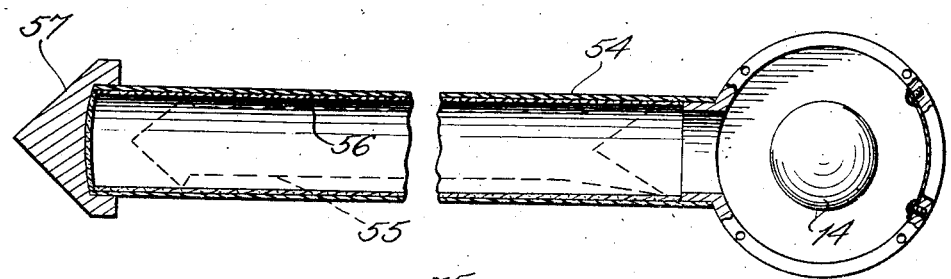
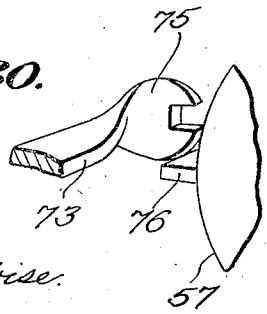

Patented May 10, 1927.

1,627,625

UNITED STATES PATENT OFFICE.

HENRY G. TUTHILL, OF LOS ANGELES, CALIFORNIA.

SIGNAL.

Application filed February 16, 1925. Serial No. 9,602.

This invention relates to direction signals for motor operated vehicles, and contemplates a signaling member adapted to normally lie horizontally pointing in the direction of the windshield, and capable of being quickly and conveniently moved upon a pivot to any one of a number of positions to indicate the intentions of the driver of the vehicle with respect to the movements of the latter, the signaling member being of hollow formation to receive an electric light bulb which is automatically illuminated when the member is moved to an active position.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing how the signaling device is mounted and different positions of the signaling member.

Figure 2 is a sectional view taken on line 2—2 of Figure 1.

Figure 3 is a fragmentary view of the signaling member and its support.

Figure 4 is a sectional view taken through the casing which constitutes the support for the signaling member and also showing the mechanism for operating the signaling member.

Figure 5 is a fragmentary longitudinal sectional view of the signaling member and its support.

Figure 6 is a sectional view taken on line 6—6 of Figure 1.

Figure 7 is a sectional view on line 7—7 of Figure 5.

Figure 8 is a sectional view taken on line 8—8 of Figure 5.

Figure 9 is a sectional view taken on line 9—9 of Figure 5.

Figure 10 is an end elevation of the signaling member and its support, the latter being shown in section.

Figure 11 is a detail view showing the switch for the support to the electric light bulb for the signaling member.

Figure 12 is a view of a modified construction and the means for supporting the mirror.

Figure 13 is a sectional view taken on line 13—13 of Figure 12.

Figure 14 is a view of a modified construction showing how the latter is mounted upon a closed car.

Figure 15 is a view showing a portion of the signal, and its normal position with relation to the support therefor, the latter being illustrated in section.

Figure 16 is a view taken on line 16—16 of Figure 15.

Figure 17 is a sectional view taken on line 17—17 of Figure 14.

Figure 18 is a sectional view taken on line 18—18 of Figure 15.

Figure 19 is a sectional view through the signal.

Figure 20 is a fragmentary view of the means for holding the signal in a normal position.

The device forming the subject matter of this invention includes a signaling member 10, the latter being in the nature of an arm of hollow formation, and having its opposed sides preferably constructed of glass or other transparent material indicated at 11 and supported or held in position by the lugs 12 and the flanges 13 as shown in Figure 7. The outline of this signaling member represents an arrow, which is mounted for pivotal movement upon a suitable support to be hereinafter described, the signaling member receiving the electric light bulb 14 which is adapted to be automatically illuminated when the signaling member or arm is moved from its normal position to anyone of the active positions illustrated in Figure 1. As shown in Figures 3 and 5, one side of the signaling member is provided with an opening 15 through which the bulb 14 is passed, when the bulb is associated with or removed from its socket 16, and this opening 15 is normally closed by a pivoted cover 17 which is held in closed position by a pin 18, when the latter is arranged in the notch 19 of the cover.

The support upon which the signaling member 10 is pivoted as in the nature of an elongated casing 20 which supports a bracket 21 of any suitable construction, and which bracket is adapted to be attached to the adjacent windshield standard 22 as shown in Figure 2. The casing 20 is arranged horizontally and is adapted to project an appreciable distance beyond the windshield standard as shown in Figure 2, and this casing is also utilized to support a bracket 23 upon which is mounted a mirror 24. The bracket 23 includes a concaved portion 25 which is slotted as at 26, the slot registering with a slot 27 in a curved bracket 22 attached to the mirror, the parts being held associated by means of a suitable fastening element 29.

Journalled in this casing 20 is a longitudinally disposed shaft 30 which supports small gears 31 and 32 at the opposite ends thereof, the former meshing with a large ring gear 33 carried by the inner end of the shank 34 of a handle 35 which is supported upon the windshield proper indicated at 36. The shank 34 is of course arranged within a suitable sleeve 37, and this sleeve passes through a bearing 38 which is fitted within an opening formed in the windshield as shown in Figure 16. Consequently, when the handle 35 is turned in either direction, it rotates the shaft 30, and thus actuates the signaling member in the manner to be presently described. The socket member 16 serves the purpose of a shaft and the bearing for this shaft is provided by an opening in the casing 20 through which the socket is extended and mounted upon this shaft is a ring gear 39, which meshes with the adjacent gear 32 of the shaft 30. It is through this connection that the signaling member 10 is swung upon its pivot incident to the turning of the handle 35. The normal or inactive position of the signaling member is indicated by dotted lines in Figure 2, wherein it will be noted that the signaling member is arranged parallel with and directly in advance of the casing 20. Now, when the handle 35 is turned to the left, it operates the shaft 30 in the manner above described to throw the signaling member outwardly to any one of the different positions illustrated by dotted lines in Figure 1. Each of the different positions having particular significance relative to the movements of the vehicle, so as to indicate to others when the vehicle is about to turn either to the right or to the left or to stop. By turning the handle 35 to the right, the signaling member can be turned from any of its active positions to its normal position as will be readily understood.

Now, the electric light bulb 14 above referred to is arranged in a normally open circuit which also includes a switch including a contact pin 40 arranged within and centrally of the socket 16 of the signaling member 10, and a resilient contact arm 41 which terminates above the pin as shown in Figure 11. This resilient contact 41 is secured to an insulated member 42 which is mounted upon one of the bearings for the shaft 30, while the underside of this resilient contact has secured thereto a shoe or block of insulated material 43 which contacts the upper edge of the socket 16. This edge is formed to provide a cam like projection 44 which normally engages the shoe or block 43 to hold the resilient contact 41 spaced from the contact pin 51, when the signaling member 10 is in its normal position. However, when the signaling member is swung to any one of its active positions in the manner above described, the cam like projection 44 is moved away from the contact 41, thereby allowing the latter through its own resiliency to engage the pin 40, thus closing the circuit to the electric light bulb 14. In this manner the signaling member is automatically illuminated each and every time it is swung to an active position. Of course when the arm is returned to its normal position, the cam like projection 44 is again brought beneath the block 43, thereby elevating or spacing the contact 41 from the pin 40.

It will be noted upon inspection of Figures 12 and 13, that the mirror can be supported on the casing 20 by means of an obliquely disposed rod 45, one end of which is terminally secured to the casing as at 46. The mirror support 47 includes a centrally arranged stud 42 which is slidably mounted upon the rod 45 and held fixed relatively thereto in any given position by means of a set screw or the like 49.

In Figures 14 to 20 inclusive, I have illustrated a modified construction designed for use on closed cars. It will be noted in this form of the invention that I make use of a tubular casing 50 which is supported on the side of the car indicated at 51 to project laterally therefrom. The body of the car is provided with an opening 52 through which part of the signal operating mechanism extends, the signal of course being controlled from inside of the car by a handle 53. The signaling member is preferably of the construction shown in Figure 19 including a hollow tubular member 54, the opposed sides of which are cut away as at 55 to provide arrow like openings, while arranged within the tubular member is a glass tube 56. The end of this signaling member is provided with a cap of glass or any other suitable material as at 57. The signaling member in its entirety is associated with the combined boss and bearing 58 which is utilized to hold the signaling member spaced from the supporting casing 50 a sufficient distance to allow the signaling member to be readily and easily moved to anyone of its active positions illustrated in Figure 1. The normal position of the signaling member is shown in Figure 14, wherein it will be noted that the said member lies in a horizontal position parallel with the casing 50 and pointing in the direction of the windshield of the vehicle. The signaling member is controlled in substantially the same manner as hereinabove described, it being provided with a crown gear 59 which is arranged to operate within a gear block 60, meshing with a gear 61 carried by one end of a shaft 62 which passes longitudinally through the casing 50 to a gear block 63 arranged inside the body of the car. This shaft 62 passes through the opening in the vehicle body above referred to. The other end of this shaft 62 enters the gear block 63 and is provided with a gear 64 which meshes with a crown gear 65. These gears are arranged within the gear block 63, the crown gear 65 being fixed to a hollow tubular member 66 projecting from said gear block 63. Telescoping within the tubular member 66 is a similar member 67 which is provided with the handle 53 above referred to. The tubular member 67 is formed with opposed slots 68, and these slots 68 receive a cross pin or bolt 69 which connects the inner and outer tubular members together for rotation as a unit, and allows the inner tubular member 67 to be moved longitudinally of the member 66. Arranged within the member 67 is a coiled spring 70, one end of which is secured to the cross pin 69 just referred to, while the other end is secured to a similar pin 71 shown in Figure 16. This spring functions to normally hold the inner tubular member 67 engaged with the boss 64 above referred to, the latter and the inner end of the tubular member being formed with cooperating clutch braces 72 which cooperate to hold the signaling member 54 in any of its active positions. The purpose of sliding the inner tubular member 67 outwardly with relation to the tubular member 66, is to effect a release of the signaling member 54 from a pivoted latch element 73 which is utilized to assist in holding the signaling member 54 in its normal position relative to the casing 50.

This structure is clearly illustrated in Figures 15, 18 and 20, wherein it will be noted that the latch elements 73 is pivoted as at 74 within the tubular casing 50, projecting through an opening therein and having its outer end offset and notched as clearly indicated in Figure 20. This notched end of the latch is indicated at 75 and is adapted to receive a lug 76 carried by the signaling member 54. The latch element 73 is connected to one end of a rod 77, which slides longitudinally of the casing 50 and has its other end secured to the adjacent branch 78 of a bell crank lever which is fulcrumed as at 79. Surrounding this rod 77 is a coiled spring 80 which influences the latch 73 to normally hold it in position shown by full lines in Figure 15. The other branch 81 of the bell crank lever just referred to is arranged in the path of movement of a flange or collar 82, carried by the inner tubular member 67, and actuated by the collar when said tubular member is moved outwardly of the member 66. In other words, the pivoted latch 73 and the collar 62 as well as the bell crank lever normally occupy the positions shown by full lines in Figure 15, and when it is desired to make use of the signal, the tubular member 67 is pulled outwardly by means of the handle 53 against the tension of the spring 70. During this operation the flanged collar 82 engages the adjacent branch of the bell crank lever rocking the latter upon its fulcrum and pulling upon the rod 77 against the tension of the spring 80, this rod in turn drawing the latch element 73 to an inactive position, thus releasing the signaling member 54. The signaling member can then be moved upon its pivot to the desired active position, by simply turning the handle 53 which turns both the inner and outer tubular members 66 and 67 respectively as a unit. After the signaling member has been arranged in a predetermined position, the spring 70 moves the inner tubular member 67 inwardly to cause the cooperating clutch braces 72 to engage each other in a manner whereby the signaling member is held fixed in its given position. In this form of the invention, the signaling member 54 is also adapted to be illuminated when swung to its active position, and includes a switch of the same character above described and wherein 84 indicates the resilient container thereof.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

An automobile direction signal comprising a casing adapted to project horizontally from the side of the vehicle, a signaling member of hollow formation, means for mounting said signaling member on said casing with the signaling member normally lying at one side and parallel with said casing, an electric light socket carried by said casing, said socket serving as a pivot shaft for said signaling member, an electric light bulb arranged in said socket and also positioned within said signaling member, means for controlling the movement of said signaling member, whereby the latter may be swung outwardly to different angular positions with relation to said casing, a switch arranged in a normally open circuit and including a contact pin arranged centrally of said pivot, a resilient contact arm, a block of insulating material carried by said arm, a cam on one end of the light socket for engaging said block of insulating material for normally holding said resilient contact spaced from said pin, and allowing said contact to engage the pin when the signaling member is swung to its active position.

In testimony whereof I affix my signature.

HENRY G. TUTHILL.